United States Patent
Kuo et al.

(10) Patent No.: US 7,899,137 B2
(45) Date of Patent: Mar. 1, 2011

(54) MOBILE COMMUNICATION SYSTEM WITH INTEGRATED GPS RECEIVER

(75) Inventors: Chang-Fu Kuo, Hsin-Chu (TW); Min Jie Wu, Singapore (SG); Beng Hwee Ong, Singapore (SG); Wee Liang Lien, Singapore (SG)

(73) Assignee: Mediatek Inc., Hsin-Chu (TW)

( * ) Notice: Subject to any disclaimer, the term of this patent is extended or adjusted under 35 U.S.C. 154(b) by 876 days.

(21) Appl. No.: 11/617,962

(22) Filed: Dec. 29, 2006

(65) Prior Publication Data
US 2008/0089445 A1 Apr. 17, 2008

Related U.S. Application Data

(60) Provisional application No. 60/829,155, filed on Oct. 12, 2006.

(51) Int. Cl.
*H03D 3/24* (2006.01)
*H04L 27/22* (2006.01)

(52) U.S. Cl. .................. 375/327; 375/344; 329/308; 342/103; 455/260

(58) Field of Classification Search .......... 375/326, 375/327, 330–332, 344, 374, 376; 329/304, 329/307, 308; 342/100–103; 455/180.3, 455/255, 257, 260
See application file for complete search history.

(56) References Cited

U.S. PATENT DOCUMENTS

| 6,668,025 | B1* | 12/2003 | Sumi et al. | 375/326 |
|---|---|---|---|---|
| 6,856,794 | B1 | 2/2005 | Tso et al. | |
| 2004/0132421 | A1* | 7/2004 | Underbrink | 455/255 |
| 2005/0080564 | A1* | 4/2005 | Tso et al. | 701/214 |
| 2005/0096004 | A1* | 5/2005 | Tso et al. | 455/334 |
| 2005/0266806 | A1* | 12/2005 | Soe et al. | 455/88 |
| 2006/0154640 | A1* | 7/2006 | Oh et al. | 455/326 |
| 2006/0176215 | A1* | 8/2006 | Dubash et al. | 342/357.06 |
| 2007/0080835 | A1* | 4/2007 | Maeda et al. | 341/120 |
| 2007/0105514 | A1* | 5/2007 | Tseng et al. | 455/189.1 |

* cited by examiner

*Primary Examiner*—Young T. Tse
(74) *Attorney, Agent, or Firm*—Thomas | Kayden

(57) ABSTRACT

A Global Positioning System (GPS) receiver integrated with a cellular phone system, comprising a single-balanced mixer, a poly phase filter, a channel select filter, an analog-to-digital converter, a reference frequency source, and a PLL unit is disclosed. The single-balanced mixer downconverts a GPS signal to generate an in-phase signal I and a quadrature signal Q. The poly phase filter generates an IF signal based on the in-phase signal I and the quadrature signal Q. The channel select filter receives the IF signal to filter unwanted channel signals. The analog-to-digital converter converts the signal from the channel select filter to a digital output signal. The reference frequency source provides a reference frequency to the analog-to-digital converter. The PLL unit receives the reference frequency for generating a clock signal to the single-balanced mixer for downconversion.

20 Claims, 4 Drawing Sheets

MOBILE COMMUNICATION SYSTEM WITH INTEGRATED GPS RECEIVER

CROSS-REFERENCE TO RELATED APPLICATIONS

The present application claims the benefit of U.S. provisional application entitled "GPS Receiver Integrated In A Mobile Communication System", Ser. No. 60/829,155, filed Oct. 12, 2006.

BACKGROUND OF THE INVENTION

1. Field of the Invention

The invention relates in general to Global Positioning System (GPS) receivers, and more particularly to GPS receivers with an integrated Code division multiple access (CDMA) system.

2. Description of the Related Art

GPS receivers, once used primarily for military and surveying applications, are finding new uses in the commercial arena. Location services, emergency location using cellular telephones, personal GPS receivers, etc. are all part of current and emerging products and services enabled by using GPS receivers. Thus, there is a high demand for adding GPS functions to wireless communications devices. More specifically, wireless communications devices with both GPS and cellular CDMA, among other services are of particular interest. Thus, integration of the CDMA system and the GPS system in a portable electronic device is desirable.

BRIEF SUMMARY OF THE INVENTION

The invention provides a Global Positioning System (GPS) receiver integrated with a cellular phone system, comprising a single-balanced mixer, a poly phase filter, a channel select filter, an analog-to-digital converter, a reference frequency source, and a PLL unit. The single-balanced mixer downconverts a GPS signal to generate an in-phase signal I and a quadrature signal Q. The poly phase filter generates an IF signal based on the in-phase signal I and the quadrature signal Q. The channel select filter receives the IF signal to filter unwanted channel signals. The analog-to-digital converter converts the signal from the channel select filter to a digital output signal. The reference frequency source provides a reference frequency to the analog-to-digital converter. The PLL unit receives the reference frequency to generate a clock signal to the single-balanced mixer for downconversion.

The invention further provides a Global Positioning System (GPS) receiver, comprising a clock source, a single-balanced mixer, a poly phase filter, a channel select filter, an analog-to-digital converter, first and second dividers, and a PLL unit. The clock source generates a reference clock signal at a first frequency. The single-balanced mixer downconverts a GPS signal to generate an in-phase signal I and a quadrature signal Q. The poly phase filter generates an IF signal based on the in-phase signal I and the quadrature signal Q. The channel select filter receives the IF signal and filters unwanted channel signals. The analog-to-digital converter converts the signal from the channel select filter to a digital output signal, wherein a sampling rate of the analog-to-digital converter based upon the reference clock signal. The first divider divides the reference clock signal by a predetermined value. The PLL unit generates a clock signal to the single-balanced mixer based on a bandwidth of the single-balanced mixer. The second divider divides the clock signal by 2 and transmits the divided clock signal to the single-balanced mixer.

The invention further provides a portable electronic device integrated with a Global Positioning System (GPS) and a cellular phone system comprising a cellular module, a GPS module, a controller and a GPS receiver. The cellular module provides a first reference clock signal at approximately 26 MHz, and the GPS module provides a second reference clock signal at approximately 16.368 MHz. The controller controls the GPS receiver to receive the first reference frequency or the second reference frequency. While 26 MHz is chosen to be GPS receiver reference clock, GPS and cellular modules can share the same reference clock that could save the cost. The GPS receiver further comprises a single-balanced mixer, a poly phase filter, a channel select filter, an analog-to-digital converter, and a PLL unit. The single-balanced mixer downconverts GPS signals to generate an in-phase signal I and a quadrature signal Q. The poly phase filter generates an IF signal based on the in-phase signal I and the quadrature signal Q. The channel select filter receives the IF signal and filters out unwanted channel signals. The analog-to-digital converter converts the signal from the channel select filter to a digital output signal, wherein a sampling rate of the analog-to-digital converter is contingent upon the reference clock signal. The PLL unit controlled by the controller receives the first reference clock signal or the second reference clock signal to generate a clock signal to the single-balanced mixer based on a bandwidth of the single-balanced mixer.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
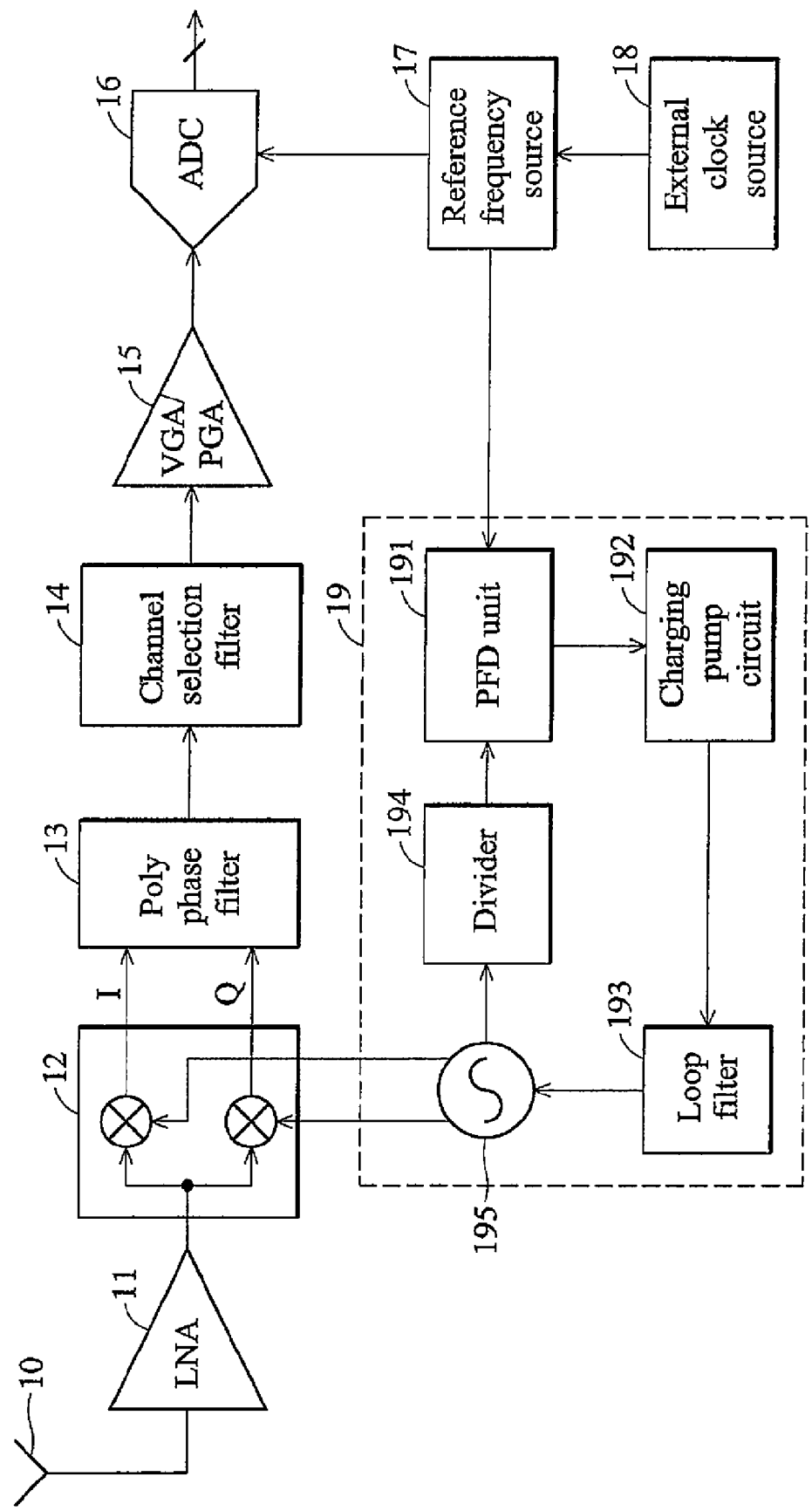
FIG. 1 is a block diagram of an embodiment of a GPS receiver.

FIG. 1 is a block diagram of an embodiment of a GPS receiver of the invention. GPS signals are typically received by a GPS antenna 10, and are then applied to a low noise amplifier (LNA) 11. The LNA 11 may be further integrated with the antenna 10 or the GPS receiver. In one embodiment, the LNA 11 comprises a filter for filtering out unwanted receiver interfering signals. The filter may be a low pass filter or band pass filter. The mixer 12 receives and processes the GPS signals from the LNA 11 to generate an in-phase signal I and a quadrature signal Q based on the frequency of the output signal generated by a phase lock loop (PLL) unit 19. According to an embodiment of the invention, the mixer 12 may be a single balanced mixer or a double balanced mixer. The signals I and Q are then applied to the poly phase filter 13 to generate a differential IF output. The GPS signals which are centered at about 1575.42 MHz are down-converted to the IF frequency at approximately 4 MHz by the mixer 12. The channel select filter 14 receives the IF signal from the poly phase filter 13 and filters out the unwanted channel signal. The gain amplifier 15 amplifies the output signal from the channel select filter 14. The gain amplifier 15 may be an analog-controlled variable gain amplifier or a digital-controlled programmable gain amplifier. The analog-to-digital converter 16 converts the output signal of gain amplifier 15 to a digital signal based on a reference frequency generated by the reference frequency source 17. In one embodiment, the reference frequency source 17 is a reference clock buffer receiving and converting an analog clock signal from an external clock source 18, such as a temperature compensated crystal oscillator, to a digital clock signal. In another embodiment, the reference frequency source 17 is an oscillator controlled by an external clock source 18.

The PLL unit 19 generates an output signal with a frequency at approximately 1571.42 MHz or 1579.42. MHz based on the reference frequency generated by the reference frequency source 17. The divider 194 takes the output signal of the voltage controlled oscillator 195 and divides it by a predetermined value, N. The phase frequency detection (PFD) unit 191 measures a phase difference and a frequency difference between the reference frequency and the output signal of the voltage controlled oscillator 195 to output a differential signal UP and a differential signal DN. The charge pump circuit 192 receives and transfers the differential signals UP and DN into a current. Then, the loop filter receives and transfers the current into a voltage applying to the voltage controlled oscillator 195, wherein the frequency of the output signal of the voltage controlled oscillator 195 is N times the reference frequency from the reference frequency source 17.

Figure 2:
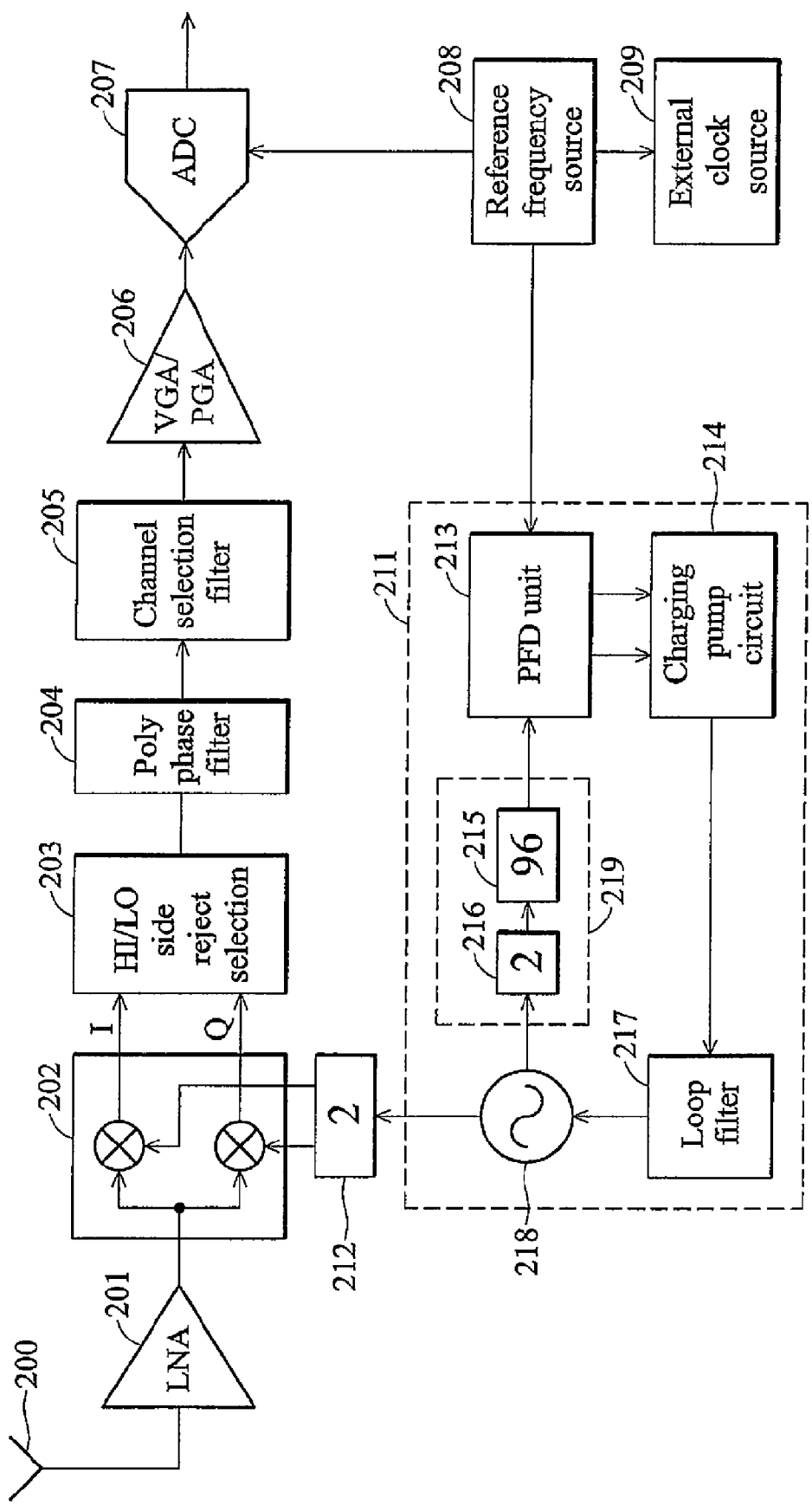
FIG. 2 is a block diagram of another embodiment of a GPS receiver.
Figure 3:
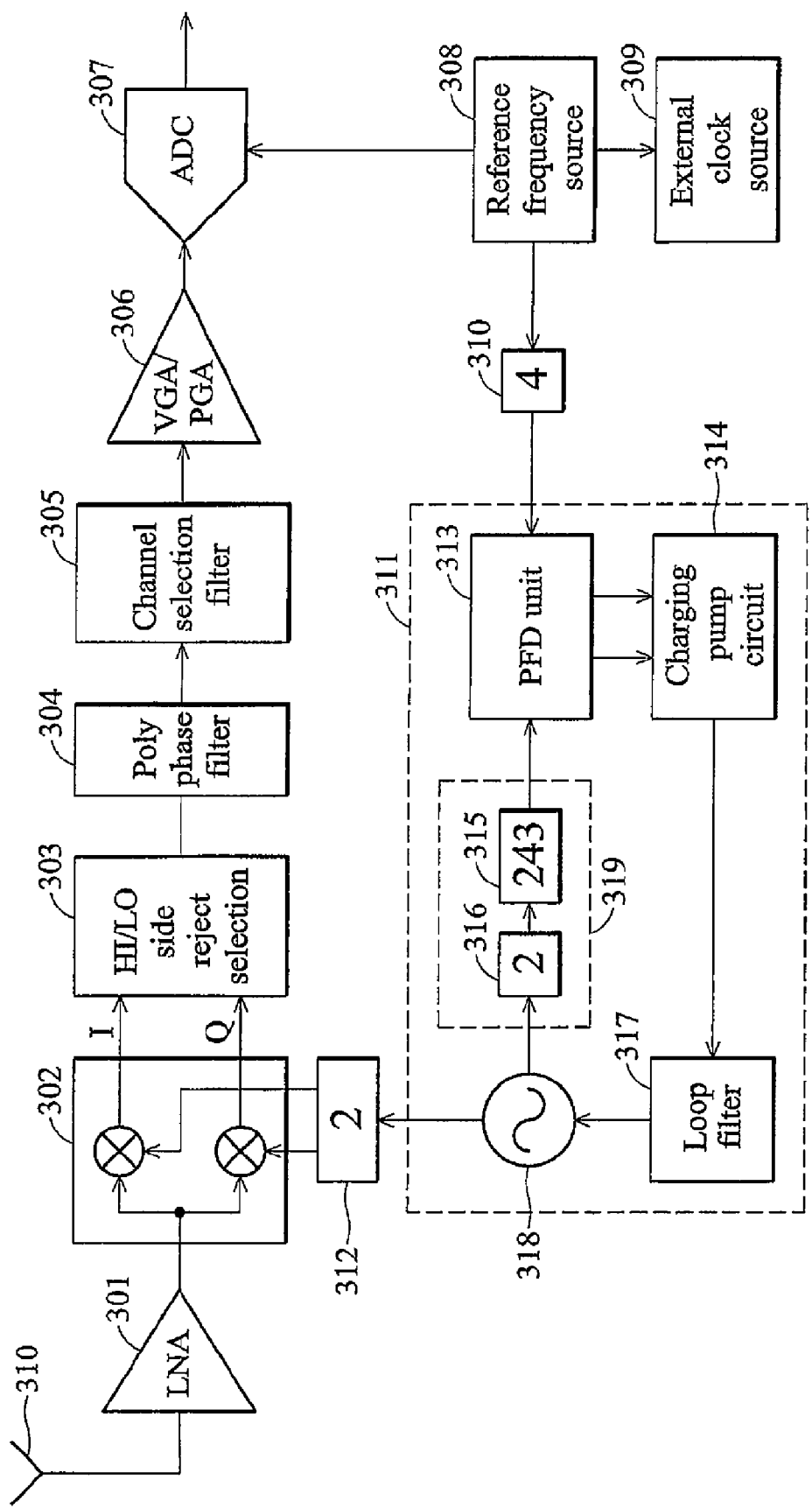
FIG. 3 is a block diagram of another embodiment of a GPS receiver.

FIG. 2 and FIG. 3 provide further illustration. In FIG. 2, the reference clock source 208 provides a first clock signal at 16.368 MHz and in FIG. 3, the reference clock source 308 provides a second clock signal at 26 MHz, wherein the second clock signal can be provided by or for a GSM or CDMA mobile system.

FIG. 2 is a block diagram of another embodiment of a GPS receiver. GPS signals at 1575.42 MHz are typically received by a GPS antenna 200, and are then applied to a low noise amplifier (LNA) 201. The LNA 201 may be integrated with the antenna 200 or the GPS receiver. In one embodiment, the LNA 201 comprises a filter for filtering out unwanted receiver interfering signals. The filter may be a low pass filter or band pass filter. The single-balanced mixer 202 receives and processes the GPS signals from the LNA 201 to generate an in-phase signal I and a quadrature signal Q based on the frequency of the output signal output by a phase lock loop (PLL) unit 211. The signals I and Q are applied to the poly phase filter 204 to generate a differential IF output through a HI/LO side reject selection unit 203. The HI/LO side reject selection unit 203, working together with the poly phase filter, rejects the image parts from the single-balanced mixer 202 and transmits the desired signal to the channel select filter 205. The GPS signals which are centered at 1575.42 MHz is down-converted to the IF frequency at approximately 4 MHz by the single-balanced mixer 202. The channel select filter 205 receives the IF signal from the poly phase filter 204 and filters out the unwanted channel signal. The gain amplifier 206 amplifies the output signal from the channel select filter 205. The gain amplifier 206 may be an analog-controlled variable gain amplifier or a digital-controlled programmable gain amplifier. The analog-to-digital converter 207 converts the output signal of gain amplifier 206 to a digital signal based on a reference frequency generated by the reference frequency source 208. In one embodiment, the reference frequency source 208 is a reference clock buffer receiving and converting an analog clock signal from an external clock source 209, such as a temperature compensated crystal oscillator, to a digital clock signal. In another embodiment, the reference frequency source 208 is an oscillator controlled by an external clock source 209. In still another example, the reference frequency source 208 and the external clock source 209 can be implemented all together. In still another example, the reference frequency source 208 can implemented alone without the external clock source 209.

The PLL unit 211 generates an output signal with a frequency at approximately 3142.84 MHz based on the reference frequency generated by the reference frequency source 208. Furthermore, the frequency of the output signal is based on the bandwidth of the single-balanced mixer 202. The first clock signal at 16.368 MHz from the reference frequency source 208 is directed to the PLL unit 211. In this embodiment, the frequency of the output signal of the PLL unit 211 is 3142.656 MHz which approximates to one desired frequency, 3142.84 MHz. The divider 219, a two step divider, takes the output signal of the voltage controlled oscillator 218 and divides it by 192. The divider 219 comprises a first divider 216 and a second divider 215. The first divider 216 takes the output signal of the voltage controlled oscillator 218 and divides it by 2. The second divider 215 then divides the signal from the first divider 216 by 96. In this embodiment, the output signal of the voltage controlled oscillator 218 is processed by a two-step division for better performance and simpler implementation. In some embodiments, the first divider 216 and the second divider 215 can be implemented as one single divider to directly divide the output signal of the voltage controlled oscillator 218 by 192. The phase frequency detection (PFD) unit 213 measures a phase difference and a frequency difference between the reference frequency and the output signal of the voltage controlled oscillator 218 to output a difference signal UP and a difference signal DN. The charge pump circuit 214 receives and transfers the difference signals UP and DN into a current. The loop filter then receives and transfers the current into a voltage applied to the voltage controlled oscillator 218 to generate the output signal at 3142.656 MHz. It should be noted that the charge pump current is made programmable so that they can share the same loop filter and the loop filter can be fixed or programmable, and it can be on-chip or off-chip. Before the output signal enters to the single-balanced mixer 202, a divider 212 divides the output signal of the PLL unit 211 by 2 and generate the quadrature clock signals for the mixer when the output signal of the PLL unit 211 is at 3142.656 MHz. In some cases, if the output signal of the PLL unit 211 is at 1571.328 MHz, the output signal of the PLL unit 211 is directly input to the single-balanced mixer 202 through a poly-phase quadrature generator instead of passing through the divider 212. It should be noted that the invention can be implemented in a GPS stand-alone device.

FIG. 3 is a block diagram of another embodiment of a GPS receiver. GPS signals at 1575.42 MHz are typically received by a GPS antenna 300, and are then applied to a low noise amplifier (LNA) 301. The LNA 301 may be integrated with the antenna 300 or the GPS receiver. In one embodiment, the LNA 301 comprises a filter for filtering out unwanted receiver interfering signals. The filter may be a low pass filter or band pass filter. The mixer 302 receives and processes the GPS signals from the LNA 301 to generate an in-phase signal I and a quadrature signal Q based on the frequency of the output signal output by a phase lock loop (PLL) unit 311. The signals I and Q are applied to the poly phase filter 304 to generate a differential IF output through a HI/LO side reject selection unit 303. The HI/LO side reject selection unit 303, working together with the poly phase filter, rejects the image parts from the single-balanced mixer 302 and transmits the desired signal to the channel select filter 305. The GPS signals which are centered at 1575.42 MHz is down-converted to the IF frequency at approximately 4 MHz by the single-balanced mixer 302. The channel select filter 305 receives the IF signal from the poly phase filter 304 and filters out the unwanted channel signal. The gain amplifier 306 amplifies the output signal from the channel select filter 305. The gain amplifier 306 may be an analog-controlled variable gain amplifier or a digital-controlled programmable gain amplifier. The analog-to-digital converter 307 converts the output signal of gain amplifier 306 to a digital signal based on a reference frequency generated by the reference frequency source 308. In one embodiment, the reference frequency source 308 is a reference clock buffer receiving and converting an analog clock signal from an external clock source 309, such as a temperature compensated crystal oscillator, to a digital clock signal. In another embodiment, the reference frequency source 308 is an oscillator controlled by an external clock source 309. In still another example, the reference frequency source 308 and the external clock source 309 can be implemented together. In still another example, the reference frequency source 308 can be implemented alone without the external clock source 309.

The PLL unit 311 generates an output signal with a frequency at approximately 3158.84 MHz based on the reference frequency generated by the reference frequency source 308. Furthermore, the frequency of the output signal is based on the bandwidth of the single-balanced mixer 302. When the divider 310 receives the first clock signal at 26 MHz from the reference frequency source 308, the divider 310 divides the first clock signal by 4. In this embodiment, the frequency of the output signal of the PLL unit 211 is 3159 MHz. The divider 319, a two step divider, takes the output signal of the voltage controlled oscillator 318 and divides it by 486. The first divider 316 takes the output signal of the voltage controlled oscillator 318 and divides it by 2. Then, the second divider 315 divides the signal from the first divider 316 by 243. In this case, the output signal of the voltage controlled oscillator 318 is processed by a two-step division for better performance and simpler implementation. In some embodiments, the first divider 316 and the second divider 315 can be implemented as one single divider to directly divide the output signal of the voltage controlled oscillator 318 by 486. The phase frequency detection (PFD) unit 313 measures a phase difference and a frequency difference between the reference frequency and the output signal of the voltage controlled oscillator 318 to output a difference signal UP and a difference signal DN. The charge pump circuit 314 receives and transfers the difference signals UP and DN into a current. Loop filter 317 then receives and transfers the current into a voltage applied to the voltage controlled oscillator 318 to generate the output signal at 3159 MHz. Before the output signal enters to the single-balanced mixer 302, a divider 312 divides the output signal of the PLL unit 311 by 2 when the output signal of the PLL unit 311 is at 3159 MHz. In some cases, if the output signal of the PLL unit 311 is at 1579.5 MHz, the output signal of the PLL unit 311 is directly input to the single-balanced mixer 302 without passing through the divider 312. It should be noted that the invention can be implemented in a mobile phone with GPS related features.

Figure 4:
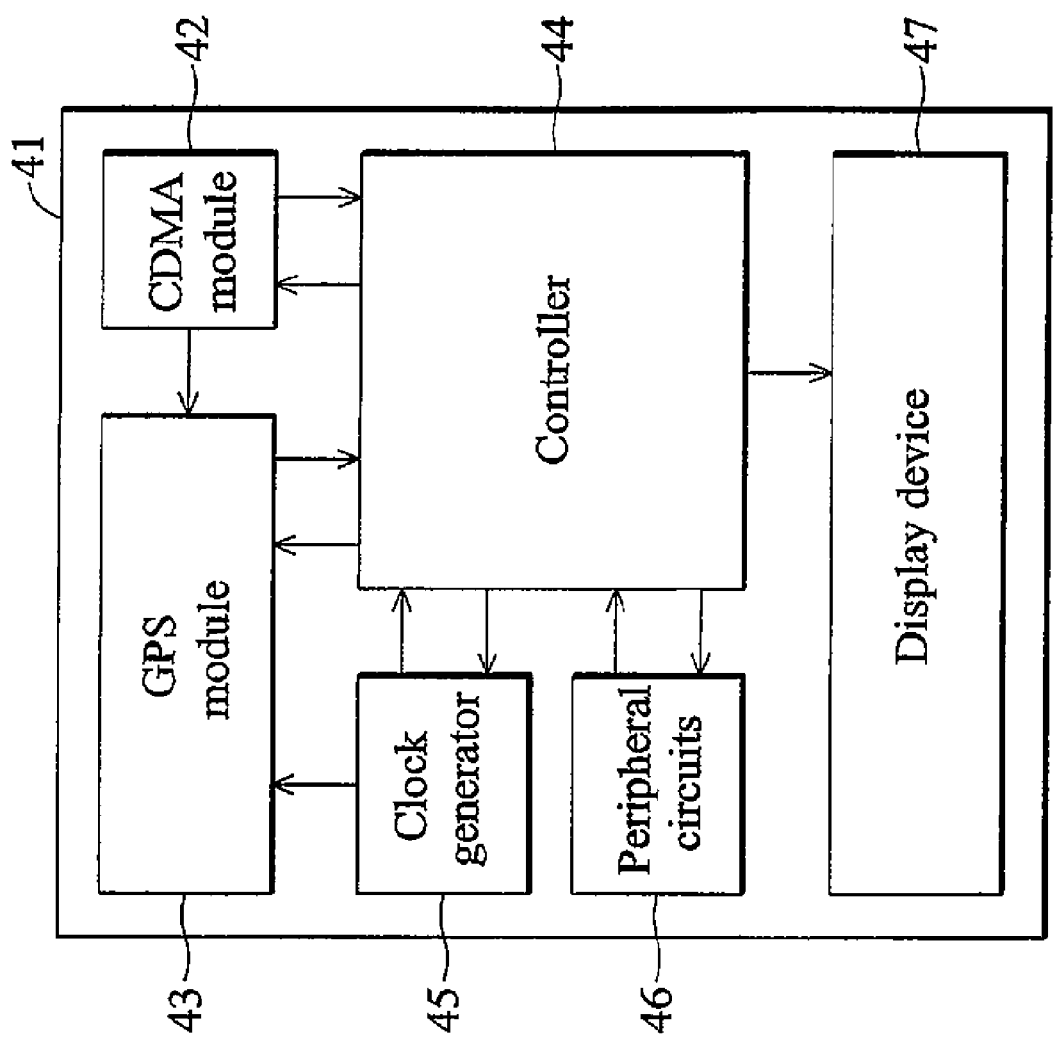
FIG. 4 is a block diagram of an embodiment of a portable electronic device with integrated cellular phone and GPS system.

FIG. 4 is a block diagram of an embodiment of a portable electronic device with integrated cellular phone and GPS system. The portable electronic device 41 comprises a CDMA module, a GPS module, a controller 44, a clock generator 45, a peripheral circuit 46 and a display device 47. The GPS module 43 receives a reference clock signal from the clock generator 45 or the CDMA module 42. The controller 44 controls the GPS module 43 to receive the reference clock signal from the clock generator or the CDMA module 42. The controller 44 further controls the peripheral circuit 46, such a keypad module, an audio device or wireless network module. The controller 44 controls and shows data on the display device 47 according to the GPS module 43, the CDMA module 42 and the peripheral circuit 46, wherein the display device 47 is a TFT display, a OLED display or a LCD display. However, it should be noted that the present invention is not limited to the cellular phone system. The GPS receiver can be utilized in other electronic systems, such as GPS facilities in cars, mobile computers, and PDAs.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A Global Positioning System (GPS) receiver integrated with a system, comprising:
    a mixer for downconverting a GPS signal to generate an in-phase signal and a quadrature signal;
    a poly phase filter, coupled to the mixer, for generating differential IF signals each based on the in-phase signal and the quadrature signal;
    a channel select filter, coupled to the poly phase filter, for receiving the differential IF signals and filtering out unwanted channel signals from the differential IF signals;
    an analog-to-digital converter, coupled to the channel select filter, for converting the filtered signal from the channel select filter into a digital output signal, wherein the digital output signal is outputted to the system; and
    a HI/LO side reject selection unit, coupled between the mixer and the poly phase filter, for rejecting image signals while the mixer is at a high side frequency and a low side frequency.

2. The GPS receiver as claimed in claim 1, further comprising:
    a reference frequency source, coupled to the analog-to-digital converter, for providing a reference frequency to the analog-to-digital converter; and
    a PLL unit, coupled to the reference frequency source and the mixer, for receiving the reference frequency and generating a clock signal to the mixer for downconversion.

3. The GPS receiver as claimed in claim 2, further comprising an external clock source coupled to the reference frequency source.

4. The GPS receiver as claimed in claim 2, wherein the PLL unit comprises:
    a divider for dividing the clock signal by an integer number N to generate a feedback signal;
    a phase and frequency detector (PFD) unit for measuring a phase difference and a frequency difference between the feedback signal and the reference frequency to generate difference signals;
    a charge pump circuit for receiving and transferring the difference signals into a current;

a loop filter for receiving and transferring the current into a voltage; and a voltage controlled oscillator for generating the clock signal based on the voltage.

5. The GPS receiver as claimed in claim 4, wherein the reference frequency is approximately at 16.368 MHz and the divider divides the clock signal by 192.

6. The receiver as claimed in claim 5, wherein the divider comprises:

a first divider for dividing the clock signal by2; and
a second divider for dividing the clock signal from the first divider by 96.

7. The GPS receiver as claimed in claim 4, wherein the reference frequency is approximately at 26 MHz and the divider divides the clock signal by 486.

8. The GPS receiver as claimed in claim 7, wherein the divider comprises:

a first divider for dividing the clock signal by 2; and
a second divider for dividing the clock signal from the first divider by 243.

9. The receiver as claimed in claim 8, further comprising a third divider for dividing the reference frequency by 4.

10. The GPS receiver as claimed in claim 1, wherein the GPS receiver further coupled to an antenna, wherein the GPS receiver further comprising a Low Noise Amplifier (LNA) coupled between the antenna and the mixer.

11. The GPS receiver as claimed in claim 1, further comprising a variable gain amplifier coupled between the channel select filter and the analog-to-digital converter.

12. The GPS receiver as claimed in claim 1, further comprising a programmable gain amplifier coupled between the channel select filter and the analog-to-digital converter.

13. The GPS receiver as claimed in claim 1, wherein the mixer is a single or double balanced mixer.

14. A Global Positioning System (GPS) receiver, comprising:

a clock source for generating a reference clock signal at a first frequency;
a single-balanced mixer having an input directed to two multipliers for downconverting a GPS signal to generate an in-phase signal and a quadrature signal;
a poly phase filter, coupled to the single-balanced mixer, for generating differential IF signals each based on the in-phase signal and the quadrature signal;
a channel select filter, coupled to the poly phase filter, for receiving the differential IF signals and filtering out unwanted channel signals from the differential IF signals;
an analog-to-digital converter, coupled to the channel select filter, for converting the filtered signal from the channel select filter into a digital output signal, wherein a sampling rate of the analog-to-digital converter is based upon the reference clock signal;
a first divider for dividing the reference clock signal;
a PLL unit for generating a clock signal based on the divided reference clock signal; and
a second divider for dividing the clock signal by 2 and transmitting the second divided clock signal to the single-balanced mixer.

15. The receiver as claimed in claim 14, wherein the PLL unit comprises:

a third divider for dividing the clock signal;
a fourth divider for dividing the clock signal from the third divider to generate a feedback signal;

a phase and frequency detector (PFD) unit for measuring a phase difference and a frequency difference between the feedback signal and the divided reference clock signal to generate difference signals;
a charge pump circuit for receiving and transferring the difference signals into a current;
a loop filter for receiving and transferring the current into a voltage; and
a voltage controlled oscillator for generating the clock signal based on the voltage.

16. The receiver as claimed in claim 15, wherein when the first frequency is approximately 16.368 MHz, the first divider is a divide-by-1 circuit, the third divider is a divide-by-2 circuit, and the fourth divider is a divide-by-96 circuit.

17. The receiver as claimed in claim 15, wherein when the first frequency is approximately 26 MHz, the first divider is a divide-by-4 circuit, the third divider is a divide-by-2 circuit, and the fourth divider is a divide-by-243 circuit.

18. A portable electronic device integrated with a Global Positioning System (GPS) and a cellular phone system, comprising:

a cellular module comprising a first reference clock signal approximate at 26 MHz;
a GPS module comprising a GPS receiver and having a second reference clock signal approximate at 16.368 MHz; and
a controller;
wherein the GPS receiver comprises:
a mixer for downconverting GPS signals to generate an in-phase signal and a quadrature signal;
a poly phase filter, coupled to the mixer, for generating differential IF signals each based on the in-phase signal and the quadrature signal;
a channel select filter, directly coupled to an output of the poly phase filter, for receiving the differential IF signals and filtering out unwanted channel signals from the differential IF signals;
an analog-to-digital converter, coupled to the channel select filter, for converting the filtered signal from the channel select filter into a digital output signal; and
a phase locked loop (PLL) unit controlled by the controller to receive the first reference clock signal or the second reference clock signal for generating a clock signal to the mixer.

19. The device as claimed in claim 18, wherein the GPS receiver further comprises:

a first divider for dividing the first reference clock signal or the second reference clock signal; and
a second divider for dividing the clock signal before entering the mixer;
and wherein the PLL unit comprises:
a third divider for dividing the clock signal;
a fourth divider for dividing the clock signal from the third divider for generating a feedback signal;
a phase and frequency detector (PFD) unit for measuring a phase difference and a frequency difference between the feedback signal and the first divided reference clock signal or the second divided reference clock signal for generating difference signals;
a charge pump circuit for receiving and transferring the difference signals into a current;
a loop filter for receiving and transferring the current into a voltage; and
a voltage controlled oscillator for generating the clock signal based on the voltage.

20. The device as claimed in claim 19, wherein the loop filter is embedded on-chip.

* * * * *